April 16, 1929. A. J. McDONELL Re. 17,270
HYDRAULIC JACK
Original Filed May 3, 1927
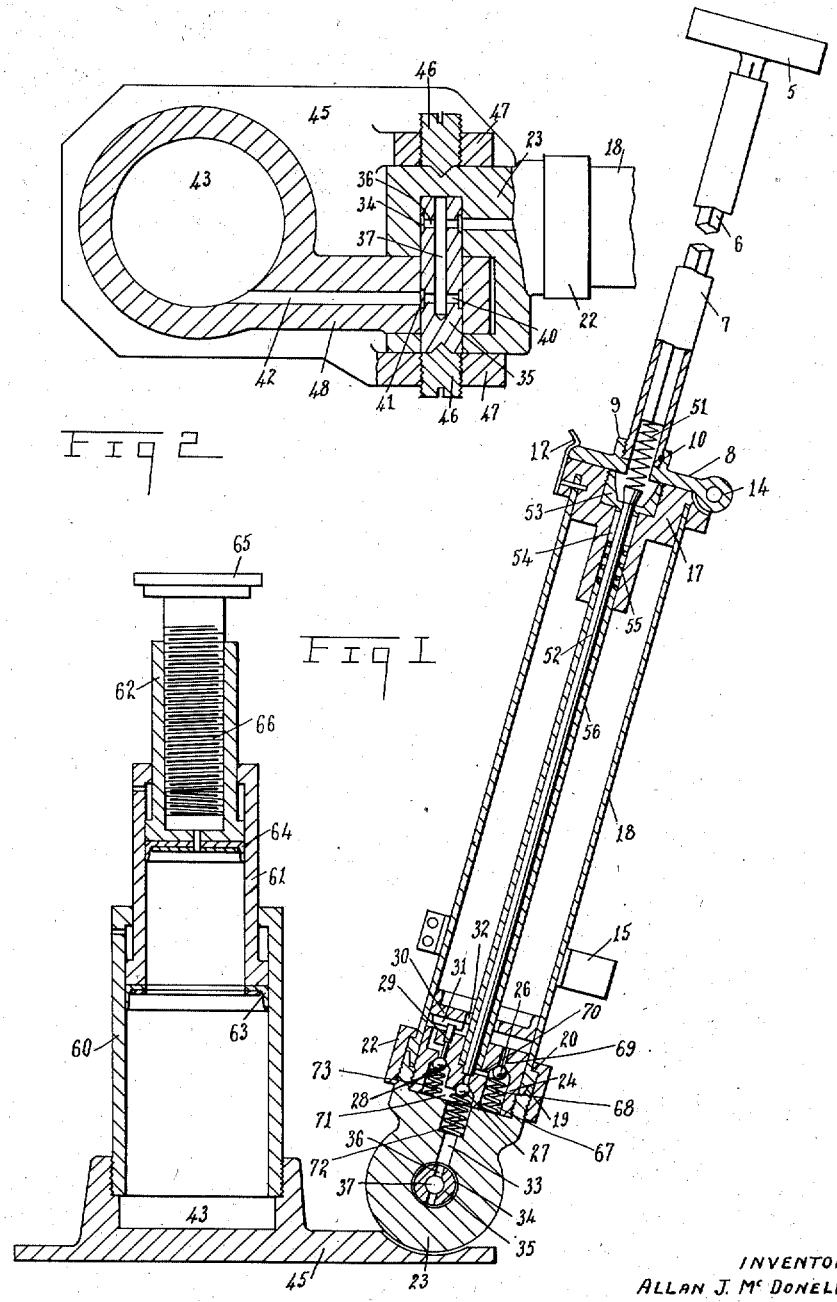
INVENTOR.
ALLAN J. McDONELL.
ATTORNEY.

Reissued Apr. 16, 1929. Re. 17,270

UNITED STATES PATENT OFFICE.

ALLAN J. McDONELL, OF VANCOUVER, BRITISH COLUMBIA, CANADA, ASSIGNOR, BY MESNE ASSIGNMENTS, TO HYDROJAX INCORPORATED, OF SEATTLE, WASHINGTON, A CORPORATION OF WASHINGTON.

HYDRAULIC JACK.

Original No. 1,665,633, dated April 10, 1928, Serial No. 188,421, filed May 3, 1927. Application for reissue filed February 11, 1929. Serial No. 339,255.

This invention relates to improvements in hydraulic jacks and more particularly to that type of jack that is light and compact in form so as to adapt it for use with motor vehicles. The automotive industry requires that an accessory must be more than workable. It must be quick and certain in operation under all conditions and further it must be convenient to use. In order to adapt the hydraulic jack to meet these strict conditions I have several objects in my invention, the first being, to provide a hydraulic jack which stores its fluid, for transferring the lifting effort to the lifting piston, in its operating member. Storing the operating fluid in this manner keeps the three valves in this member well lubricated and assures a sufficient supply of fluid to prime the pump at all times. This arrangement has the further advantage of reducing in size that portion of the jack that must be placed under the part to be lifted. This is of a particular advantage when motor vehicles are built as close to the ground as at present.

Another object of my invention is providing a hydraulic jack with a pivoted pump and reservoir and a folding pump handle. In present day automobile construction the rear axle is very inaccessible, due to the common practice of mounting spare tires and bumpers at the rear of the car. To overcome this difficulty, I have provided a pivoted pump and reservoir and a pump handle of sufficient length, when extended, as will enable one to properly and easily position the jack without crawling under the car. For the reason that the jack must be carried in the car at all times and is used but rarely, I pivot the pump and reservoir to the base casting of the jack so that it may be folded to lie parallel to the axis of the lifting piston. To further reduce the length of the jack when stored, I provide a folding joint to the pump handle.

I accomplish these objects by devices illustrated in the accompanying drawings, wherein:—

Figure 1 is a sectional view of my invention in elevation through the center of the lifting piston and operating member.

Figure 2 is a sectional view of the same in plan through the tubular pivot pin forming the joint between the pump and reservoir base block and the base casting.

Referring to the drawings throughout which like numerals indicate like parts, the numeral 5 designates the hand grip of the pump handle to which is attached a squared rod 6. This rod 6 is adapted to reciprocate in the outer tube 7, the bore of which is square to engage the rod 6. The tube 7 is secured to the hinge cap 8 by the threads 9 and the lock pin 10. A latch 12 serves to hold the pump handle in operating position and when hinged about the pin 14 the clip 15 holds the pump handle in storing position.

A plug casting 17 supports the hinge pin 14 and forms a closure of the upper end of the oil storage reservoir 18. The lower end of the tube 18 is finished with a tapered portion 19 immediately above which is a square shoulder 20. Coacting with the shoulder 20 is the gland nut 22 adapted to secure the tube 18 to the pivot block 23 in a manner permitting a partial revolution of the tube 18. In the pivot block 23, or as I have illustrated in a separate piece 24 secured thereto are seats for the intake valve 26, the check valve 27 and the return flow valve 28 together with their respective operating springs. The intake valve 26 located in the chamber 67 is normally held by the spring 68 against its seat so as to close the port 69 leading from the reservoir. An open port 70 connects the chamber 67 with the pump cylinder. Valves 27 and 28 are positioned in a separate chamber 71 and held against their respective seats by springs 72 and 73. The check valve 27 prevents the return of liquid from the chamber 71 to the pump cylinder 56. In engagement with the valve 28 is the tappet 29. Immediately above the tappet 29 is a ring 30 having a passage 32 therethrough, that is secured to the tube 18, and made integral therewith is a face cam 31, on its lower side.

A passageway 33 communicates with the annular groove 34 in the pivot pin 35. Ports 36 in turn communicate with the central passage 37.

Another set of ports 40 communicate with the annular groove 41 which in turn communicates with the passage 42 which discharges into the lifting piston base chamber 43. The pivot block 23 is secured to the base 45 by pivot screws 46 screwed into lugs 47 which are part of the base 45. A passageway 42 is enclosed in the lug 48 which is given sufficient breadth to prevent leakage of oil.

Secured to the rod 6 is the folding connector 51, shown in the form of a coil spring, which is in turn connected to the pump piston 52. To prevent oil leakage at this point I employ a packing nut 53, packing 54 and pressure spring 55. The pump cylinder 56 is snugly fitted in the plug 17 but is permitted to turn therein. At its lower end the cylinder 56 is secured to the member 24 or the pivot block 23 by an oil tight joint.

Secured to the base 45 is the guide casing 60. Operating within the said guide casing may be any ordinary type of hydraulic piston or a compound piston arrangement as shown as pistons 61 and 62 with their operating washers 63 and 64 respectively. Attached to the top of the lifting piston may be a swiveling head 65 or a head made a part of an adjusting screw 66 as shown.

The method of operating my invention is substantially as follows: Assuming it be desired to jack up the wheel of an automobile, first the cap 8, tube 7 and rod 6 with its handle 5 are unfolded and secured in an operative position by means of the clip 12. The extended operating member is then pivoted about the pin 35 until it has reached a position where it will clear the overhanging portion of the car and still be in a convenient operating position. The head 65 is then placed directly under its point of engagement with the vehicle axle or frame. A pumping effort is applied to the pump handle 5 which with its coacting parts withdraws the piston 52. A suction is created in the chamber 67 through the port 70 which opens the valve 26 and fills the void behind the pump piston 52 with the operating fluid. On reaching the limit of the outward stroke of the piston 52 the valve 26 closes under action of its seating spring 68.

On the inward stroke the check valve 27 is forced from its seat and the operating fluid is forced in turn through the passages 33, 36, 37, 40 and 42 into the chamber 43. This additional fluid in the chamber 43 will lift the lifting piston a given amount. This cycle must be repeated until the vehicle has been raised a desired amount. The relative areas of the pump piston and the lifting piston, as in all hydraulic jacks, will determine the rate of lift and the power possible to exert.

When it is desired to lower the vehicle, the cam bearing ring 30 is rotated, by application of a rotary effort on the pump handle 5, until the cam 31 begins to engage the tappet 29 and forces the valve 28 from its seat gradually at a controlled rate. This gives the fluid a continuous channel through the passages 42, 40, 37, 36, 33 and 32 to return to the storage reservoir 18. Circulation on the return is produced by the weight of the vehicle on the head 65. It is apparent that, due to the annular grooves 34 and 41 in the pivot pin 35, the transfer of fluid is unaffected by the angular position of the operating member about the pivot pin 35.

It will be obvious from the foregoing that my jack consists of the following elements; the lifting piston assembly with its passage, the operating member, including the pump, the reservoir and valve carrying pivot block, the pivot connection with its passage, and the folding pump handle, which in combination, provide means whereby the fluid stored in the reservoir, is put under pressure by the pump and is transferred from the reservoir to the lifting piston assembly to elevate the load on the jack, and is then returned to the reservoir under control, to lower the load as desired. This combination also provides that when it is desired to carry the jack in the car, it can be folded together to occupy a comparatively small space, ready for immediate and convenient use.

Manifestly numerous changes in the form of detail and plan of construction of my hydraulic jack may be made without departing from the spirit and scope of my invention or sacrificing any of its advantages.

I claim:

1. In a hydraulic jack, a lifting piston, a base casting, an operating member pivoted thereto, comprising a fluid storage reservoir, a pump therein having a piston, a pump handle, a folding connection between the handle and piston, a guideway for the pump handle hinged to the reservoir and means through which fluid is transferred between the reservoir and the lifting piston.

2. In a hydraulic jack, a lifting piston, a base casting, an operating member pivoted thereto, comprising a fluid storage reservoir, a pump mounted therein having a piston, a pump handle connected to the piston, means through which fluid is transferred between the reservoir and the lifting piston, including a return passage, a valve in said passage and a cam controlling the valve operated by the rotation of the pump handle on its longitudinal axis.

3. In a hydraulic jack, a lifting piston, a base casting, an operating member pivoted thereto, comprising a fluid storage reservoir, a pump therein having a piston, a pump handle, a folding connection between the handle and piston, and means through which fluid is transferred from the reservoir to the lifting piston.

4. In a hydraulic jack, a lifting piston, a base casting, an operating member pivoted thereto, comprising a fluid storage reservoir, a pump therein having a piston, a pump handle, a folding connection between the handle and piston, a guideway for the pump handle mounted on the reservoir and means through which fluid is transferred from the reservoir to the lifting piston.

5. In a hydraulic jack, a lifting piston, a base casting, an operating member, comprising a valve-carrying base block having a pivot connection to the base casting, a reservoir mounted on the base block, a head to said reservoir, a pump mounted between the base block and the reservoir head, within the reservoir, a folding pump handle connected to said pump, and means through which fluid is transferred from the reservoir to the lifting piston.

6. In a hydraulic jack, a lifting piston, a base casting, an operating member comprising a valve-carrying base block having a valveless pivot connection to the base casting, a reservoir mounted on the base block, a head to said reservoir, a pump mounted on the base block within the reservoir, a folding pump handle connected to said pump, a guide-way for said pump handle mounted on the reservoir head, and means through which fluid is transferred from the reservoir to the lifting piston, and from the lifting piston to the reservoir.

7. In a hydraulic jack, a lifting piston, a base casting, an operating member comprising a valve carrying base block having a valveless pivot connection to the base casting, a reservoir mounted on the base block, a pump mounted on the base block within the reservoir, a pump handle connected with the pump, there being a main passage in the base block and leading from the pump through the pivot connection to the lifting piston, a check valve in this passage, a passage from the reservoir to the pump, a valve in this passage, a return passage from the main passage to the reservoir, a valve in this passage, and means to control the valve in the return passage comprising a cam operated by the pump handle rotating on its longitudinal axis.

8. In a hydraulic lifting jack, a multi-part casing comprising a base, a cylinder, and bearing lugs, a lifting piston, a pivot block pivoted in the lugs supporting a pump, a reservoir, valved passages in the pivot block, a valve controlling the return of liquid to the reservoir, an operating handle, connections for operating the pump by longitudinal reciprocation of the handle, and means actuated by rotation of the handle about its longitudinal axis for actuating the said valve.

9. In a hydraulic lifting jack, a cylinder casing, a lifting piston in the cylinder casing, a reservoir casing pivotally connected with the cylinder casing, a pump carried by the reservoir casing, valved passages in the casings through which liquid may be forced from the reservoir to the space beneath the piston or returned to the reservoir, a valve controlling the return of liquid to the reservoir, an operating handle, connections for operating the pump by longitudinal reciprocation of the handle, and means actuated by rotation of the handle about its longitudinal axis for actuating the said valve.

10. In a hydraulic jack, a casing, a lifting piston therein, an operating member pivoted to the casing comprising a reservoir and a pump, valved connections between the reservoir, pump and casing, and a handle foldably connected with the operating member and adapted to operate the pump.

11. In a hydraulic jack, a casing, a lifting piston therein, an operating member pivoted to the casing comprising a reservoir and a pump, valved connections between the reservoir, pump and casing, an operating handle, and means for supporting the handle on the operating member whereby it may be folded into substantial parallelism with the operating member or held in substantial alignment therewith.

12. In a hydraulic jack, a casing, a lifting piston therein, an operating chamber comprising a reservoir and a pump, valved connections between the reservoir, pump and casing, an operating handle, and means for supporting the handle on the operating member whereby it may be folded into substantial parallelism with the operating member or held in substantial alignment therewith, connections for operating the pump by reciprocation of the handle, and means for controlling certain of the valved connections by rotation of the handle about its longitudinal axis.

13. In a hydraulic jack, a casing, a lifting piston therein, an operating member comprising a reservoir and a pump pivotally connected with the casing, valved connections between the reservoir, pump and casing, and a handle foldably connected with the operating member and adapted to operate the pump.

14. In a hydraulic jack, a casing, a lifting piston therein, an operating member comprising a reservoir and a pump pivotally connected with the casing, valved connections between the reservoir, pump and casing, an operating handle, and means for supporting the handle on the operating member, and means whereby it may be folded into substantial parallelism with the operating member or held in substantial alignment therewith.

15. In a hydraulic jack, a casing, a lifting piston therein, an operating member comprising a reservoir and a pump pivotally connected with the casing, valved connections between the reservoir, pump and casing, an operating handle, and means for supporting the handle on the operating member, and means whereby it may be folded into substantial parallelism with the operating member or held in substantial alignment therewith, connections for operating the pump by reciprocation of the handle, and means for controlling certain of the valved connections by rotation of the handle about its longitudinal axis.

ALLAN J. McDONELL.